(12) United States Patent
Ferman

(10) Patent No.: US 8,657,508 B1
(45) Date of Patent: Feb. 25, 2014

(54) CAMERA STABILIZATION AND SUPPORT APPARATUS

(71) Applicant: Extreme Hunting Solutions, LLC, Randolph, NJ (US)

(72) Inventor: Randall Ferman, Randolph, NJ (US)

(73) Assignee: Extreme Hunting Solutions, LLC, Centerville, IA (US)

( * ) Notice: Subject to any disclaimer, the term of this patent is extended or adjusted under 35 U.S.C. 154(b) by 0 days.

(21) Appl. No.: 13/777,555

(22) Filed: Feb. 26, 2013

(51) Int. Cl.
| G03B 17/00 | (2006.01) |
| A01M 31/00 | (2006.01) |
| F16M 13/02 | (2006.01) |
| G08B 13/196 | (2006.01) |

(52) U.S. Cl.
CPC ............. *A01M 31/00* (2013.01); *A01M 31/002* (2013.01); *F16M 13/02* (2013.01); *G08B 13/19632* (2013.01)
USPC .......................................................... 396/427

(58) Field of Classification Search
CPC .................. G08B 13/19617; G08B 13/19632; A01M 31/00; A01M 31/02; F16M 13/02
USPC .......................................................... 396/427
See application file for complete search history.

(56) References Cited

U.S. PATENT DOCUMENTS

| 7,905,465 B1* | 3/2011 | Anwar .......................... 248/673 |
| 2002/0085844 A1* | 7/2002 | Tashiro et al. ................ 396/427 |
| 2008/0136916 A1* | 6/2008 | Wolff ............................ 348/169 |

OTHER PUBLICATIONS

Extreme Hunting Solutions website, "The Wedge", 2013.*
ATA 2013 Trade Show, Randall Ferman, "The Wedge", Jan. 2013.*

* cited by examiner

*Primary Examiner* — Clayton E Laballe
*Assistant Examiner* — Linda B Smith
(74) *Attorney, Agent, or Firm* — Lerner, David, Littenberg, Krumholz & Mentlik, LLP

(57) ABSTRACT

In one embodiment, the present invention includes an apparatus for stabilizing a camera, the apparatus including a first main body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the camera, and at least one of the edges of the top, bottom, left and right surfaces including a plurality of teeth along at least a portion of a length of the at least one edge. The first main body may be stackable with a second main body. In a preferred arrangement, the apparatus can be used to stabilize a trail camera.

24 Claims, 12 Drawing Sheets

CAMERA STABILIZATION AND SUPPORT APPARATUS

BACKGROUND OF THE INVENTION

Many hunters utilize cameras, specifically trail cameras, to track their prey. For example, a hunter can set up multiple areas with strategically positioned food, scent, or other attractants, to attract prey. In order to monitor the multiple areas, a hunter will use trail cameras or the like. Typically, a trail camera is positioned in or on a tree, and secured thereto, in order to position the lens of the camera in the direction of the attractant. However, in many situations, attaining the correct positioning of the lens of the camera can be difficult, and thus, suitable positioning of the camera is not possible, resulting in impaired viewing capability. For example, there may not be a tree positioned at a particular angle needed for the lens of the trail camera, once secured thereto, to be directed towards the attractant. Moreover, most trees have an uneven surface, and thus a trail camera secured to the uneven surface may not be stable, and thus may be susceptible to movement through the movement of the tree due to the wind or other environmental factors. Additionally, a camera secured to an uneven surface of the tree may be difficult to position, and thus, the lens may not capture the attractant, or worse, the prey attracted to the area.

Cameras such as trail cameras come in a variety of sizes, and are generally rectangular in shape. Such cameras may be secured to the tree through a variety of attachments, such as a strap which is sized to wrap around the tree and secure the camera thereto. Examples of typical trail cameras include the Game Spy (Moultrie Feeders, Alabaster, Ala., USA); Truth® Cam (Primos Hunting, Flora, Miss., USA); Ambush and Attack Series (Cutteback Digital, Green Bay, Wis., USA); or the like.

In light of these limitations of typical trail cameras, a new apparatus is needed to increase the utility of these cameras.

BRIEF SUMMARY OF THE INVENTION

Generally, the present invention concerns an apparatus and method of using such an apparatus to support and stabilize a trail camera against a stationary structure. For example, the trail camera may be positioned against a stationary structure such as a tree, or specifically a tree trunk or between the tree trunk and a branch. The apparatus may allow a user to stabilize and position the camera, relative to the tree, to take more accurate images, direct the lens of the camera towards a specific direction, or the like. The present invention may also allow for more secured and stabilized positioning of the trail camera against a tree having an uneven surface. Specifically, the apparatus of the present invention can include a plurality of teeth positioned to engage the stationary structure to increase stabilization of the trail camera.

In one embodiment, the present invention includes an apparatus including a main body having at least front, top, bottom, left and right surfaces forming a wedge shape, the top and bottom surfaces including a concave back edge adapted to engage a stationary structure, and the front surface including a surface texture adapted to engage the camera. The back edge of any or all of the top, bottom, left and right surfaces can include a plurality of teeth positioned to engage the stationary structure. The main body may be adapted for positioning between a stationary structure and a camera, specifically for example a trail camera. The stationary structure may be a tree trunk or branch such that the concave back edges may be positioned on the tree trunk or branch and the plurality of teeth can engage the tree trunk or branch to increase stability of the apparatus.

In another embodiment, the present invention includes an apparatus for stabilizing a camera, the apparatus including a main body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the camera, and at least one of the edges of the top, bottom, left and right surfaces including a plurality of teeth along at least a portion of a length of the at least one edge. Additionally, the apparatus may include a second main body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the camera, and at least one of the edges of the top, bottom, left and right surfaces including a plurality of teeth along at least a portion of a length of the at least one edge, wherein the first body includes at least one tab on at least one of the right and left surfaces and the second body includes at least one slot on at least one of the right and left surfaces wherein the at least one tab is shaped to engage the at least one slot. Further, the first main body may stack on top of the second main body, and the first and second main bodies, once stacked, may form a wedge shape. The camera in this embodiment may be a trail camera.

Continuing with this embodiment, the plurality of teeth of the first main body can be positioned along the top edge, or alternatively, along at least a portion of the lengths of each of the top, left and right edges. Regardless of their positioning, the plurality of teeth can be adapted to engage a portion of a tree.

In a further embodiment, the present invention includes an apparatus for stabilizing a trail camera, the apparatus including a first stackable body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the trail camera, each of the edges of the top, left and right surfaces including a plurality of teeth along at least a portion of respective lengths of the edges. Additionally, the apparatus can include a second stackable body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the trail camera, each of the edges of the top, left and right surfaces including a plurality of teeth along at least a portion of respective lengths of the edges, and at least one slot on at least one of the right and left surfaces, wherein the first stackable body includes at least one tab on at least one of the right and left surfaces; and the at least one tab is shaped to engage the at least one slot. Further, the plurality of teeth can be positioned along the entirety of the top, left and right edges, of either the first stackable body, second stackable body, or both. The stationary structure may be a tree, such as a tree trunk or branch.

In yet another embodiment, the present invention includes a kit including a plurality of stackable bodies. Each stackable body may include at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage a camera, such as a trail camera, and at least one of the edges of the top, bottom, left and right surfaces including a plurality of teeth along at least a portion of a length of the at least one edge. The stationary structure may be a tree, such as a tree trunk or branch. Further, the kit may include stackable bodies each having the same angle of inclination or, alternatively, may have varying angles of inclination. Each stackable body may also include at least one tab on at least one of the right and left surfaces and/or at least one slot on at least one of the right and left surfaces wherein the at least one tab of one stackable body is shaped to engage the at least one slot of another stackable body. Each stackable body of the kit may include the same arrangement of plurality of teeth on one or more of the edges, or, alternatively, each stackable body can include different arrangements of teeth along one or more of the back edges. The plurality of teeth on each stackable body may also differ as to shape, size, orientation, and other like characteristics.

In another embodiment, the present invention includes a method of stabilizing a camera against a stationary structure including the steps of positioning the camera adjacent to the stationary structure; positioning a first stackable body having at least front, top, bottom, left and right surfaces forming a wedge shape, each of said surfaces having an edge, and each of the edges of the top, left and right surfaces including a plurality of teeth along at least a portion of respective lengths of the edges, such that the plurality of teeth engage the stationary structure and the front surface engages the camera; and adjusting the first stackable body and camera to stabilize the camera against the stationary structure. Further, the top and bottom surfaces may both include a concave back edge, wherein the concave back edges engage the stationary structure having a substantially convex surface. The stationary structure may be a tree and the camera is a trail camera, wherein the substantially convex surface of the tree is a trunk or branch of the tree. The front surface of the stackable body includes a surface texture to increase friction between the front surface and the camera. Additionally, the first stackable body may include at least one tab on at least one of the right and left surfaces.

Thus, continuing with this embodiment, the method may further include the additional step of positioning a second stackable body adjacent to the first stackable body, the second stackable body having at least front, top, bottom, left and right surfaces forming a wedge shape, wherein the second stackable body includes at least one slot on at least one of the right and left surfaces. The first and second stackable bodies may be positioned relative to one another such that the at least one tab of the first stackable body engages the at least one slot of the second stackable body. In this configuration, the top and bottom surfaces of the second stackable body include a concave back edge, wherein the concave back edges engage the stationary structure having a substantially convex surface, and the front surface of the first stackable body engages the camera. Additionally, the step of adjusting may further include adjusting the stacked first and second bodies and the camera to stabilize the camera against the stationary structure.

DETAILED DESCRIPTION

Figure 1:
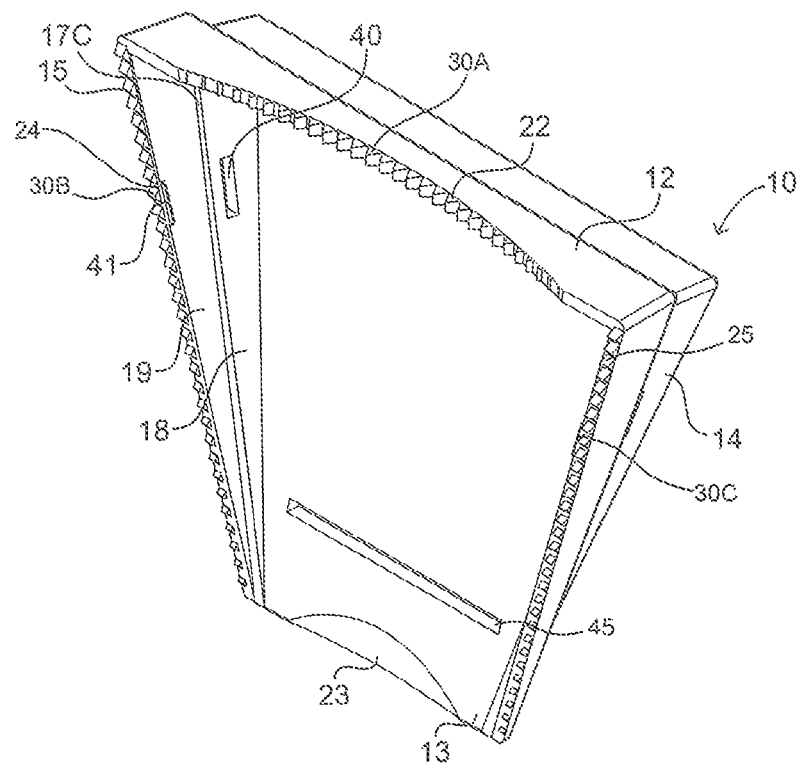
FIGS. 1-10 illustrate various views of one embodiment of an apparatus of the present invention.
Figure 2:
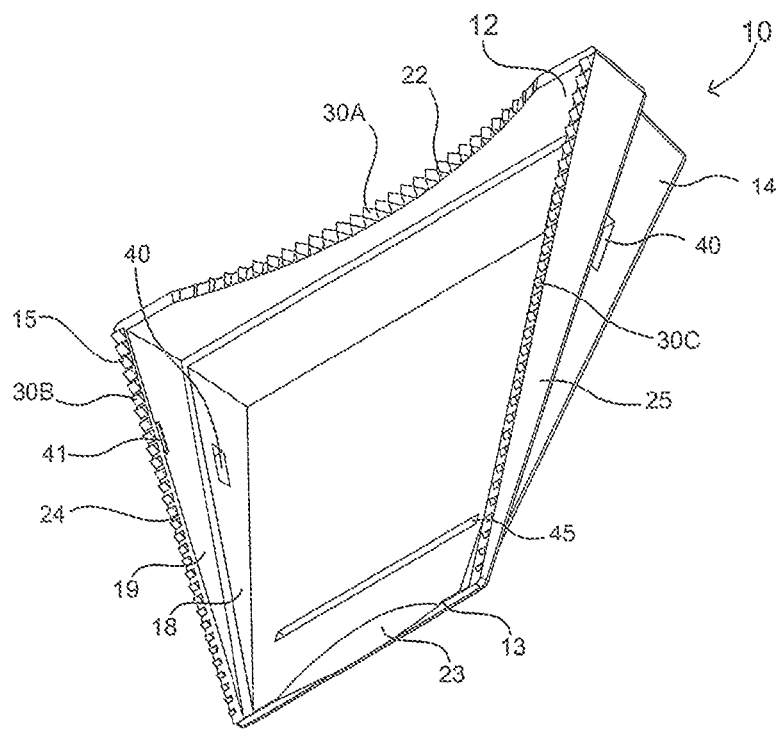

One embodiment of the present invention is illustrated in FIGS. 1-10. This embodiment includes a main body 10 having at least front 11, top 12, bottom 13, left 14 and right 15 surfaces forming generally a wedge shape which, as illustrated, has a height which decreases along the length of the front surface 11 from the top surface 12 towards the bottom surface 13. The underside of the main body 10 is preferably generally hollow, as illustrated for example in FIGS. 1 and 2, to allow for stacking of multiple such bodies, discussed below, though the main body 10 may alternatively be solid, e.g., may further include a back surface. Such a main body 10, generally, is also the subject of a co-pending application, U.S. application Ser. No. 13/688,938, filed Nov. 29, 2012, the entirety of which is incorporated by reference herein as if fully set forth herein. While the various illustrated embodiments herein show a main body 10 having a certain width, height and length, it is envisioned that the main body 10 of the present invention may have any dimensions as desired such that, in another example, the main body 10 may have a narrow width and a longer length, such that the main body 10 more closely resembles a stick. Such dimensions may provide a main body 10 more suitable for packing in, for example, a bow or rifle case. Conversely, the main body 10, in another example, could have a wider width, and a shorter length, and may be useful in situations where space is limited, and thus the shorter height allows the main body 10 to be positioned in tighter spaces. Other dimensions are also envisioned.

Figure 21:
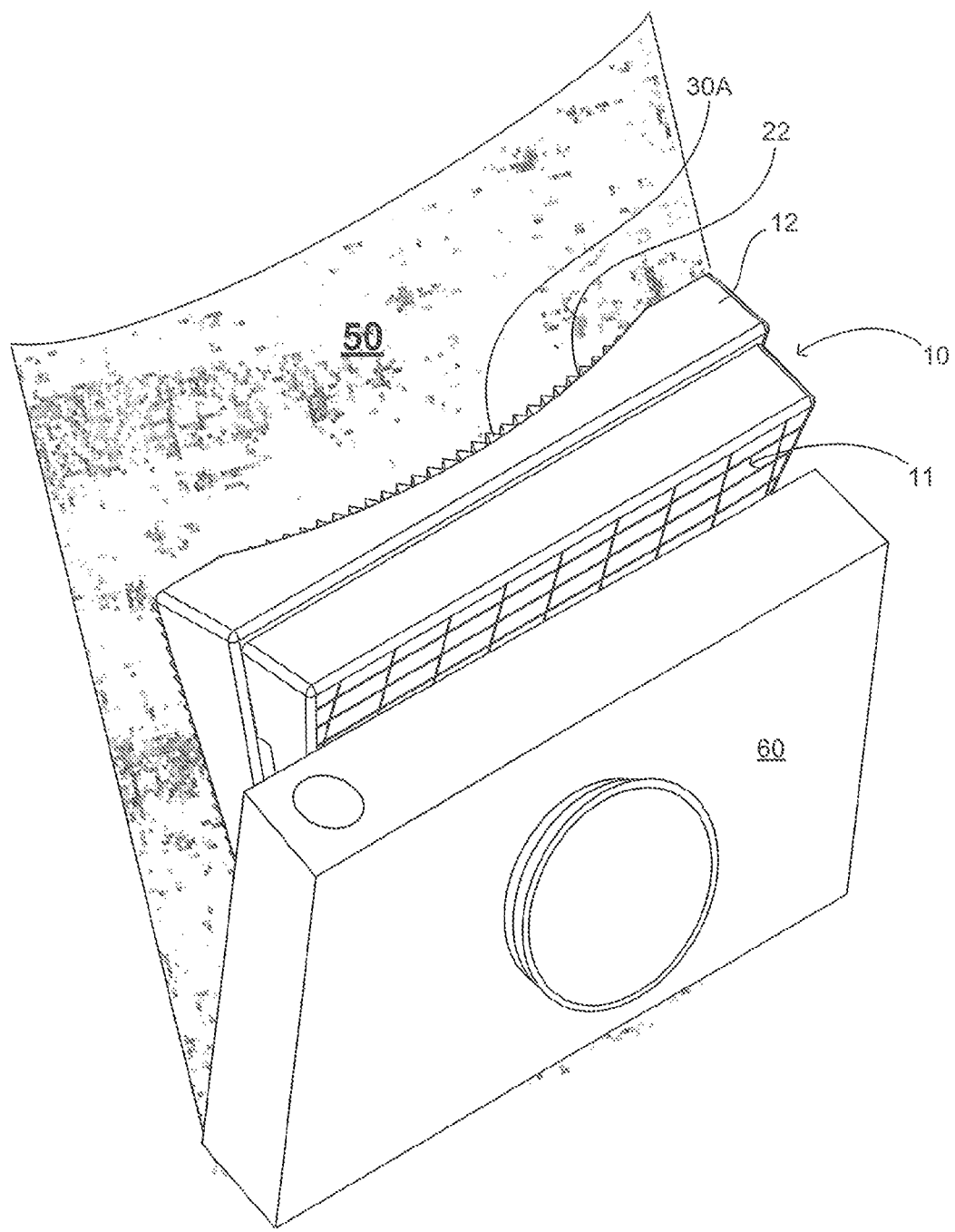
FIG. 21 illustrates one embodiment of a method of use of the apparatus of the present invention.
Figure 22:
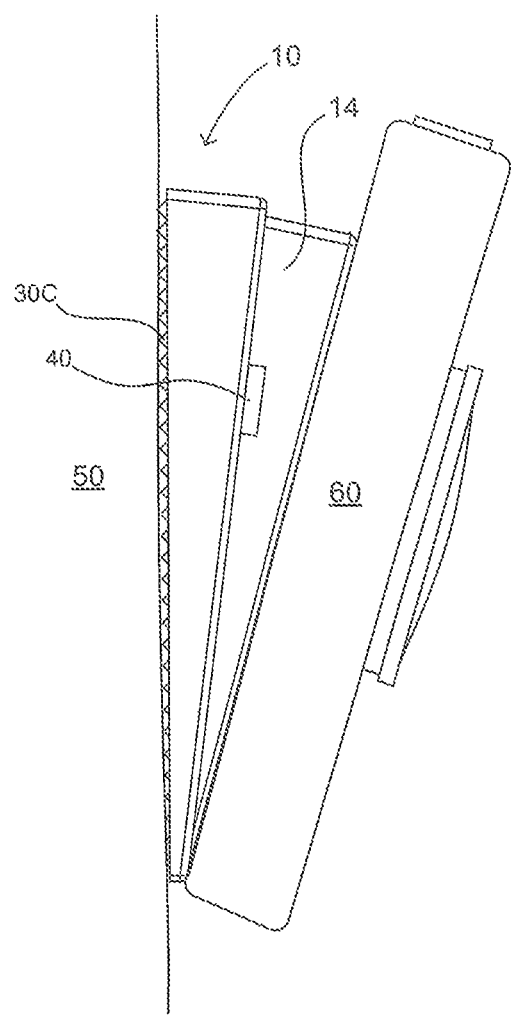
FIG. 22 illustrates another embodiment of a method of use of the apparatus of the present invention.

The top surface 12 and bottom surface 13 may each include a back edge 22, 23, respectively, which is shaped to accommodate a stationary structure 50 (see FIGS. 21 and 22, for example). For example, as illustrated, the back edges 22, 23 may be generally concave along at least a portion of the back edges to accommodate the trunk or branch of a tree 50 (as in FIGS. 21 and 22).

Continuing with this embodiment, as illustrated in FIGS. 1-10, at least one of the top surface 12, bottom surface 13, left surface 14 and right surface 15 may include a plurality of teeth, exemplified by teeth 30A, 30B, 30C (generally referenced to herein as plurality of teeth 30), extending along at least a portion of the length of their respective edges 22, 23, 24, 25 thereof. In a preferred embodiment, as illustrated, the plurality of teeth may extend along the entirety of the length of the edges of three surfaces (top 12, left 14 and right 15). Optionally, the plurality of teeth may also extend along the bottom surface 13 to create a perimeter of teeth (not shown). As discussed in greater detail below, the plurality of teeth may provide an improved grip of the main body 10 against a stationary structure (see FIGS. 21 and 22). Of course, it is envisioned that the plurality of teeth may be positioned in any pattern around any or all of the lengths of the surfaces of the main body. For example, in another preferred embodiment, the plurality of teeth 30 may be positioned only along the generally concave back edges 22, 23 of the main body, or alternatively, only on the edges 24, 25 of the left and right surfaces 14, 15. Further, the plurality of teeth may vary from one another in shape, size, orientation, and other like characteristics, as may be desired for a particular use or application. For example, the plurality of teeth may extend along only a portion of a length of an edge of one surface, or may be positioned intermittently along the edge of the one surface. Preferably, the plurality of teeth may extend along an entire length of at least an edge of one surface, and more preferably, the plurality of teeth may extend along the entire lengths of each of the edges of the top, left and right surfaces.

Figure 3:
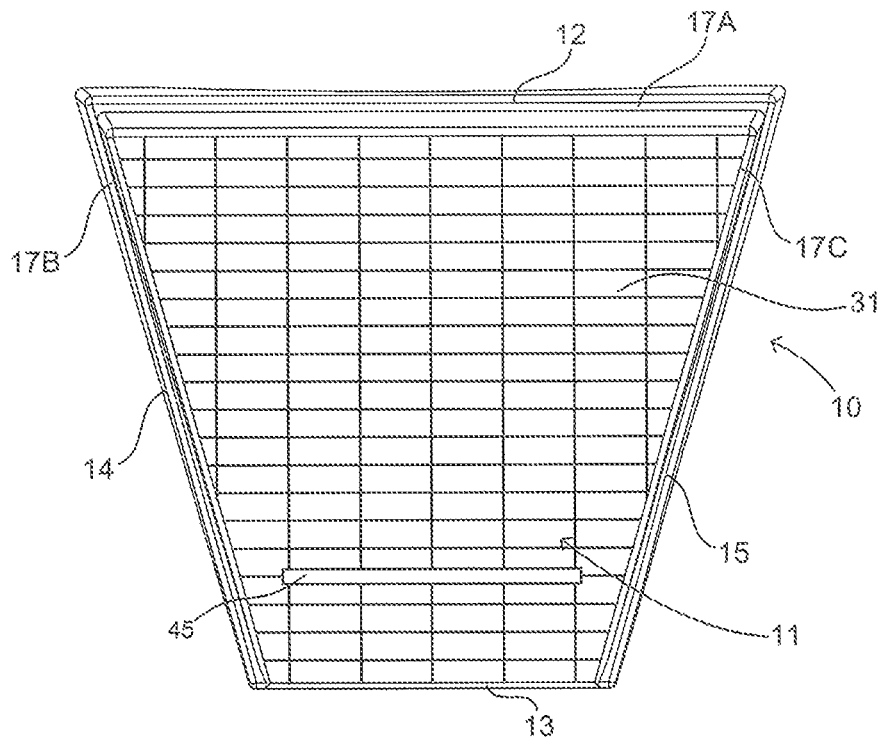
Figure 4:
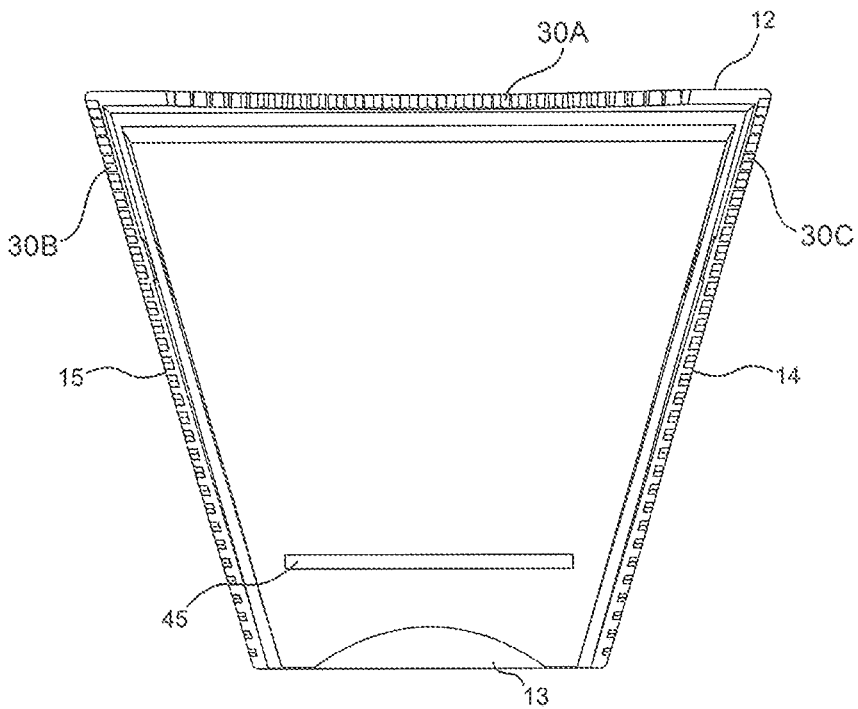
Figure 5:
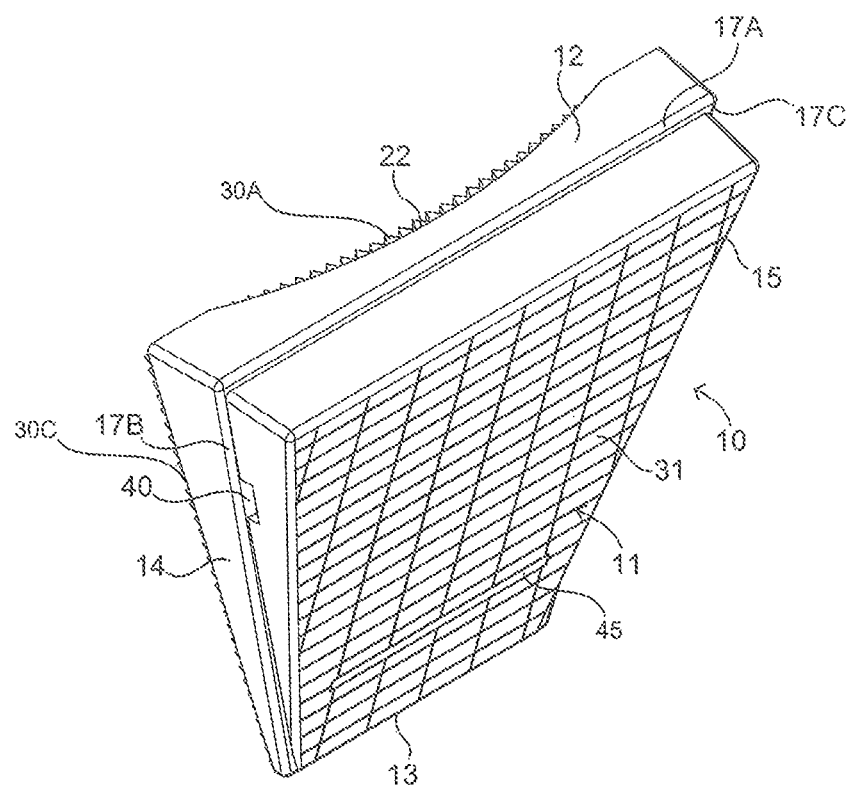
Figure 6:
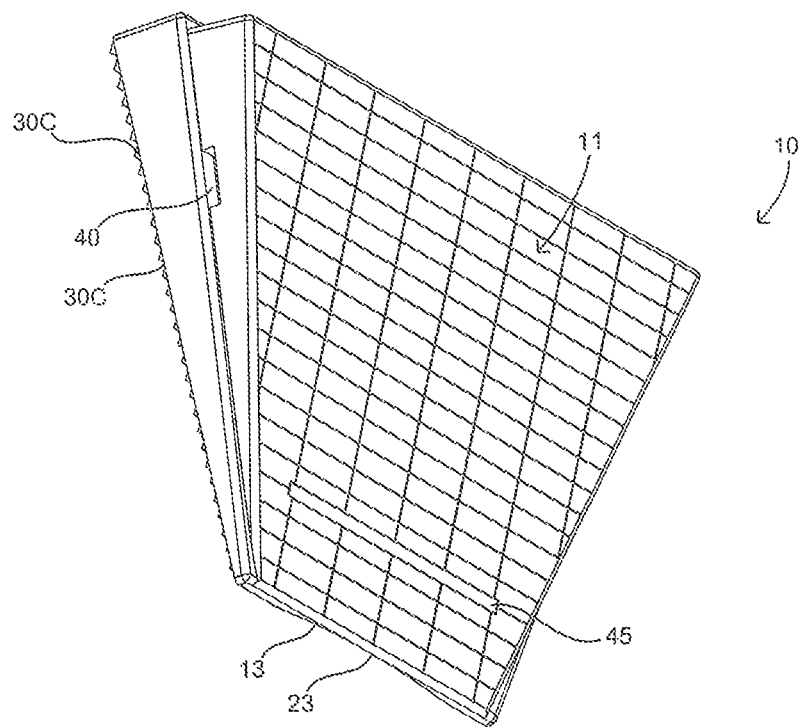
Figure 7:
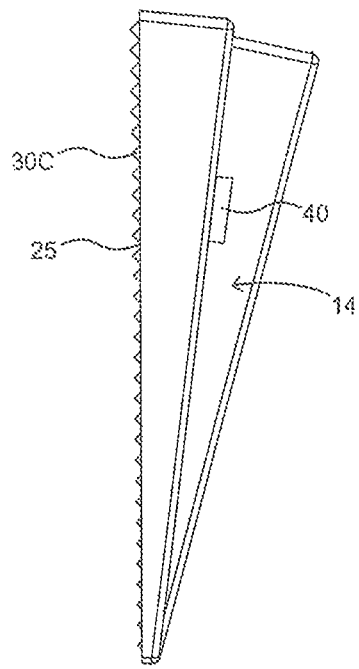
Figure 8:
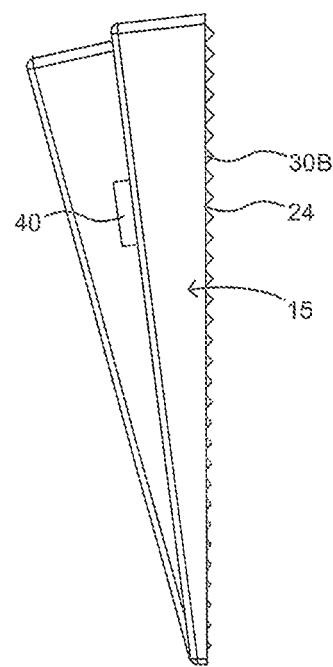
Figure 9:
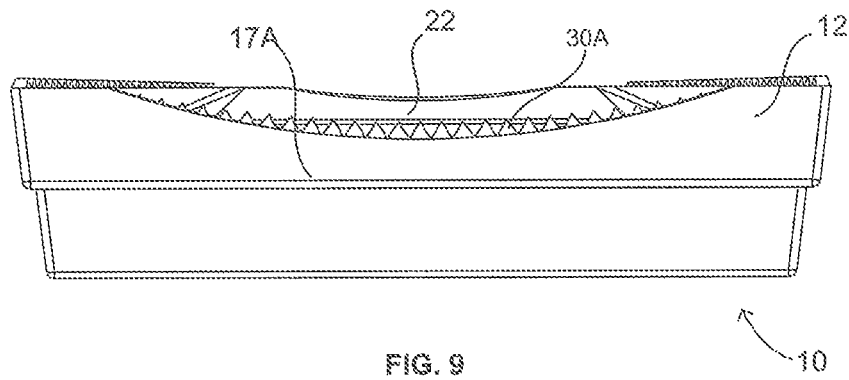
Figure 10:
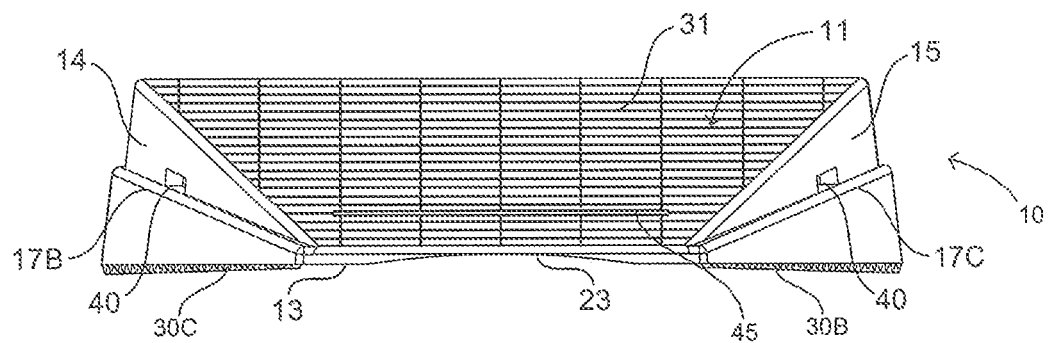
Figure 11:
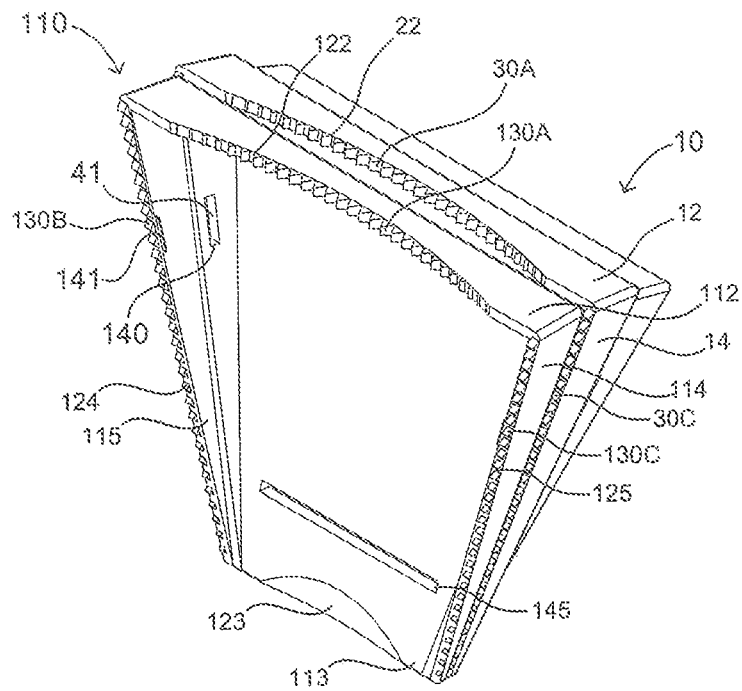
FIGS. 11-20 illustrate various views of a second arrangement of the apparatus of FIGS. 1-10.
Figure 12:
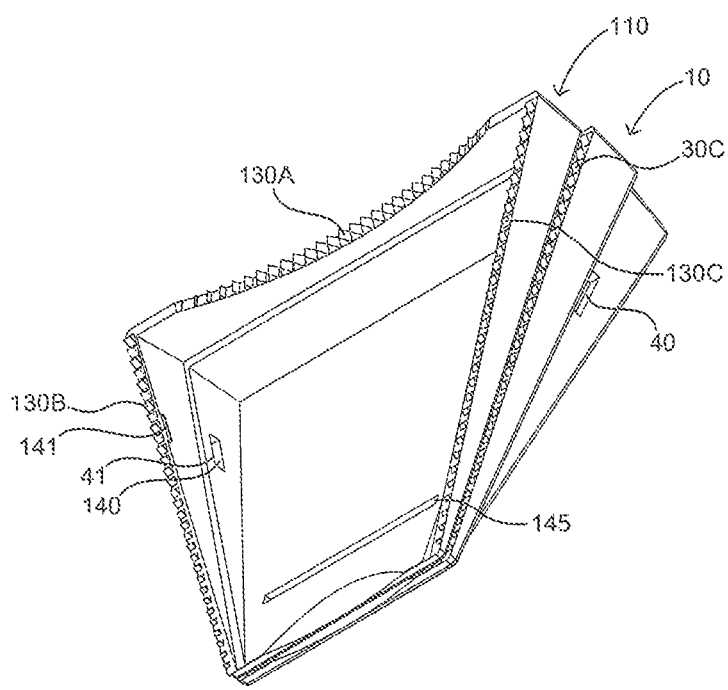
Figure 13:
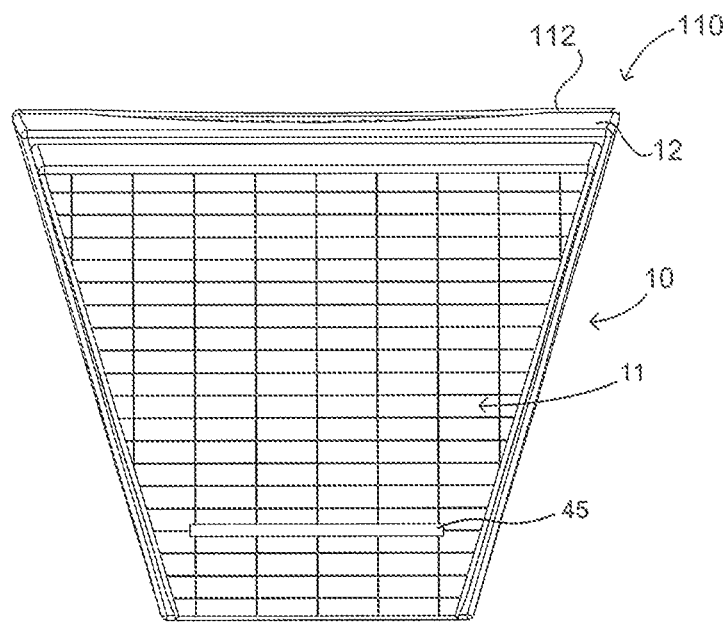
Figure 14:
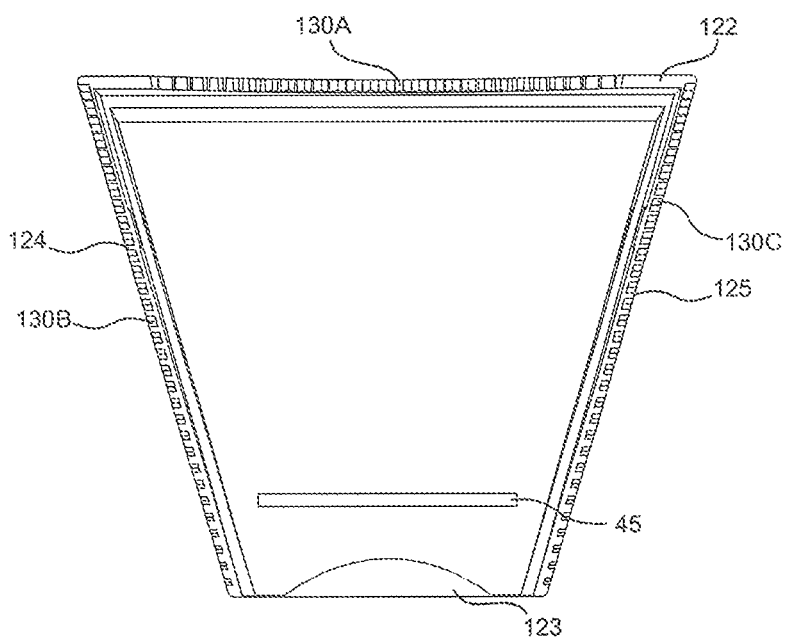
Figure 15:
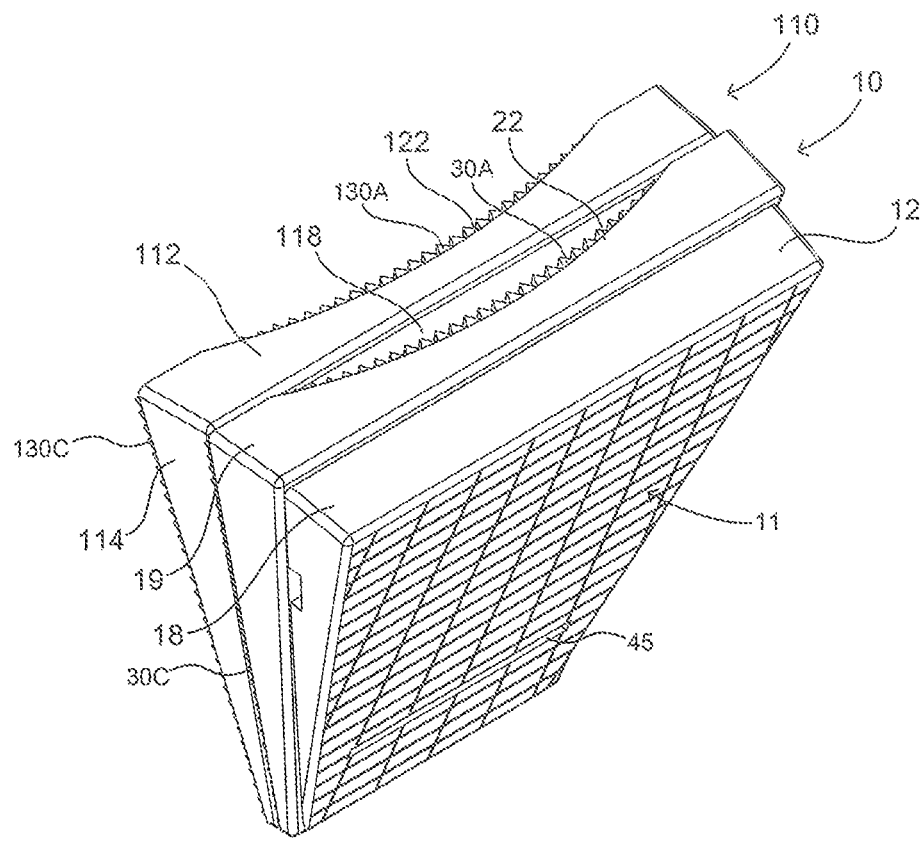
Figure 16:
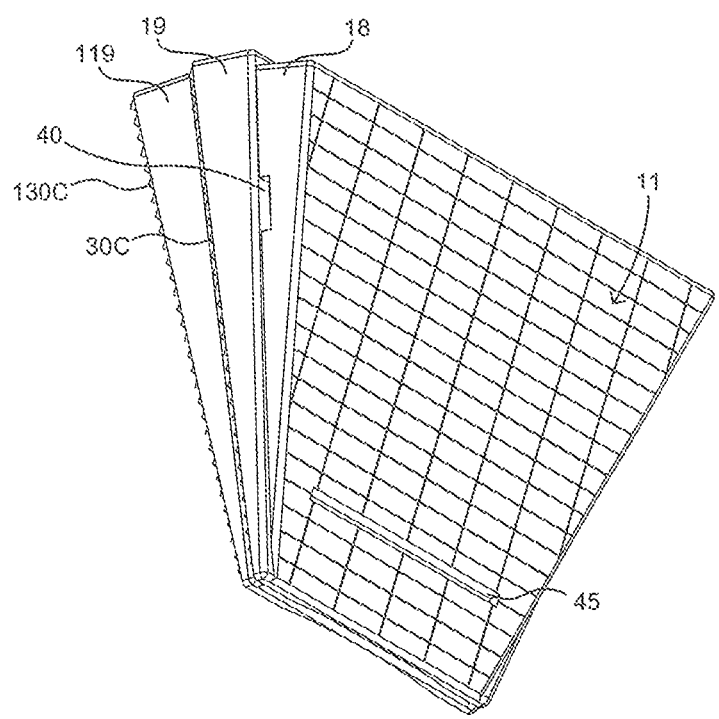
Figure 17:
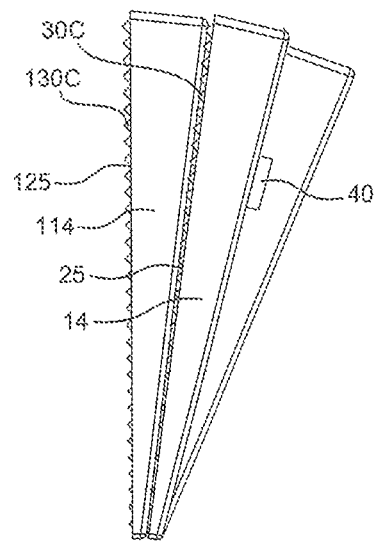
Figure 18:
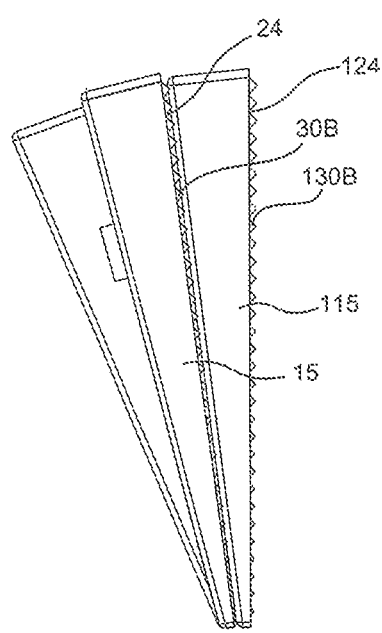
Figure 19:
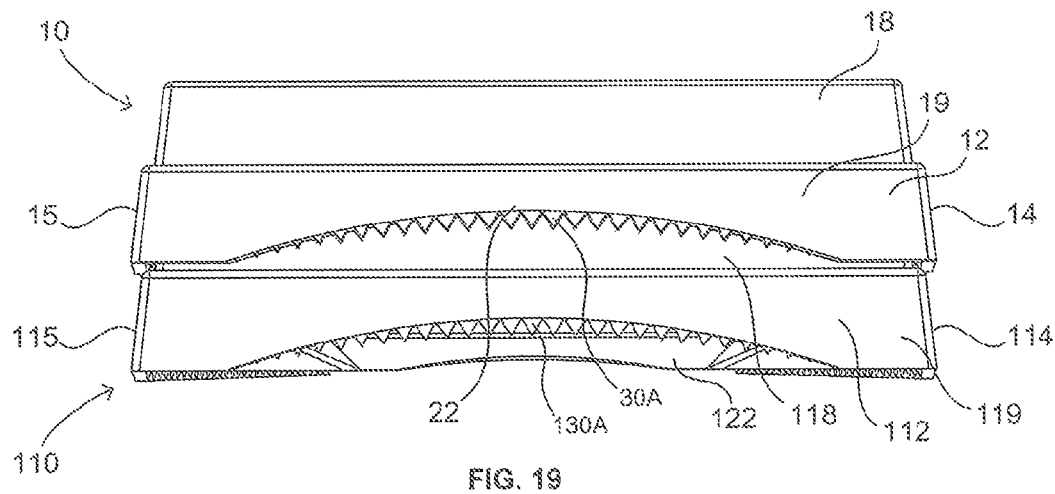
Figure 20:
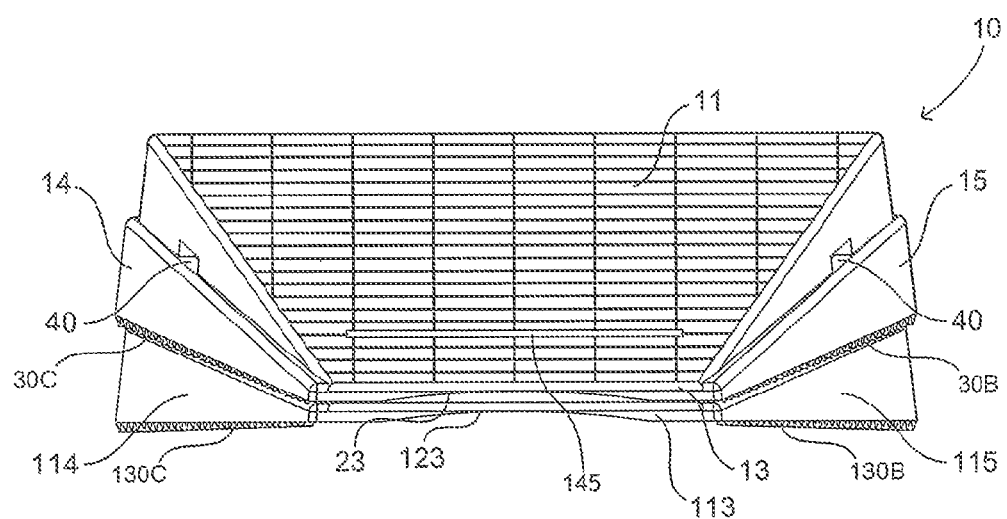

As illustrated in FIG. 3, the front surface 11 may be adapted to contact a portion of a camera 60 (see FIGS. 21 and 22, for example), such that the front surface 11 contacts the camera 60 while the back edges, 22, 23 of the top and bottom surfaces 12, 13, contact the stationary structure 50 (e.g., the tree trunk or branch). Camera 60 may specifically be a trail camera, as discussed above. Further, the front surface may include a surface texture 31 thereon to increase the friction between this surface of the main body 10 and the trail camera 60 to enable better engagement between the main body 10 and the camera. The texture may include physical structures such as grooves, areas of elevation, protrusions or the like. Alternatively, the texture may be a layer of rubber or like material suitable to enhance the friction between the main body 10 and the trail camera.

Optionally, the main body 10 may also include at least one slot 45 through which a strap (not shown) or the like may pass. This slot, or optionally, slots, may allow for simplified positioning and securing of the main body against a stationary structure 50. For example, prior to placement of the camera, a separate strap (not shown) may be positioned through the slot to secure the main body to the stationary structure and to allow a user to release the main body, while it remains in position, to focus on other activities such as preparing the camera, preparing a trap or attractant for the potential prey, or the like.

Continuing with this embodiment, as illustrated in FIGS. 1-10, the top, right and left surfaces 12, 14, 15 may include a step 17A, 17B, 17C, respectively, forming a stepped surface around the sides of the main body 10. While this stepped surface is preferable, other such surfaces may also be used, such as a curved surface, a linear surface, or the like.

Further, as illustrated in FIGS. 1, 2, 5, 6, 7, 8 and 10, the main body 10 may include at least one slot 40 and/or at least one tab 41. For example, as illustrated, both a slot 40 and a tab 41 are positioned on the left and right surfaces 14, 15 of the main body. Specifically, the slot 40 is positioned above the tab 41, such that the slot is positioned on an upper step 18 while the tab is positioned on a lower step 19 of the left and right sides. Moreover, while each slot 40 may pass through the entire thickness of both the left and right surfaces, as illustrated, each tab may be positioned on the underside of both the left and right surfaces. Of course, other slot and tab configurations are also envisioned, such that a wedge may include only one slot, or only one tab, or only one slot and tab, or two slots and two tabs (as illustrated), or more than two slots and more than two tabs. Alternatively, the slot may only pass through a portion of the thickness of the surface on which it is located. Also, as a further example, at least one slot and/or at least one tab may be positioned on other of the surfaces of the main body 10, such as the top surface 12. Similarly, the positioning of the tab 41 may be in a location other than on the underside of the right and/or left surfaces.

Both the stepped surface 17A-C and the slot 40 and tab 41 structures may provide for the engagement of a main body 10 to at least another main body. One embodiment of this stacked configuration is illustrated in FIGS. 11-20. As illustrated, the stacked configuration of the first main body and a second main body 110 also forms a wedge shape coincident with the wedge shape of each of the main bodies individually. The second main body 110 may have substantially the same shape and design characteristics as the first main body, such that, for example, the stepped surfaces of both main bodies are coincident with one another. In this embodiment, the first main body 10 is stacked on top of the second main body 110, such that the upper step 118 of the second main body 110 fits within a lower step 19 of the first main body 10 since generally the lower step 19, 119 has a larger perimeter than the upper step 18, 118.

Upon fitting the two main bodies together, as illustrated in FIGS. 11, 12, 17, and 18, the at least one slot 140 of the second main body 110 may engage an at least one tab 41 of the first main body 10, as the slot is shaped to engage the tab. This engagement may serve to removably secure the first and second main bodies to one another. As discussed above, the slot and/or tab may be positioned in a location on the main body other than as illustrated, though the positioning of the slot and tab must ensure proper alignment of a slot of one main body to a tab of another main body. While only two main bodies are illustrated, it is envisioned that more than two main bodies may be removably secured to one another, specifically if each main body includes both at least one slot and at least one tab, as in this embodiment, such that each main body may removably engage to adjacent main bodies above and below.

Such stacking of the main bodies allows for added height of the wedge shape. For example, a single main body may provide a wedge shape having an about 10 degree angle of inclination, which is the measure of the incline from the bottom surface 12 to the top surface 13 along the front surface 11. If an angle of inclination of about 20 degrees is desired, two such main bodies may be stacked on one another. And if about 30 degrees of angle is required, a third main body may be removably secured to the other two main bodies. These inclination angles are merely exemplary, as the wedges may be available in any degree of angle, such as 2.5 degrees, 5 degrees, 15 degrees, 25 degrees, or the like. Moreover, of course, the actual angles of each main body, as well as the determination by the user of the particular angle needed, may have to account for overlap of adjacent main bodies which may decrease the resulting angle of multiple main bodies stacked atop one another. Such ability to adjust the angle of the wedge shape may be useful to accurately and more securely position the camera adjacent the stationary structure, particularly if, for example, a larger relative angle, between the camera and stationary structure, is required.

In another embodiment, illustrated in FIGS. 21 and 22, the present invention includes a method of stabilizing a camera 60, specifically a trail camera 60, against a stationary structure 50. The method includes a user positioning the trail camera adjacent to the stationary structure and positioning a first stackable body 10 such that the top and bottom surfaces 12, 13 engage the stationary structure and the front surface 11 engages the camera. The user then adjusts the first stackable body and camera to stabilize the camera against the stationary structure. As discussed above, the top and bottom surface edges may have a concave back edge 22, 23, as illustrated, such that the concave back edges engage the stationary structure, such as a tree trunk or tree limb, having a substantially convex surface. The front surface 11 may include a surface texture to increase friction between the front surface and the camera. Finally, for additional securement of the camera, particularly where, as illustrated, there is no branch supporting the underside of the camera, a strap (not shown) or the like may be wrapped around the stationary structure to secure the camera, and body 10, to the stationary structure.

In this method, the main body 10 and trail camera 60 may be positioned adjacent the stationary structure 50 simultaneously. Alternatively, the camera may be positioned adjacent to, and contacting, the stationary structure first to determine the necessary angle of inclination to correctly position the camera relative to the stationary structure. Upon determining the necessary angle of inclination, the user may select at least one main body 10 to achieve the correct angle of inclination. For example, the user may take at least one test photograph (or video or the like) to determine whether the camera is positioned properly, and may make hand adjustments as necessary until the proper positioning is achieved. Then, the user may select the proper main body 10, or main bodies, to maintain the camera in this proper position. Optionally, prior to placing the main body or bodies between the camera and the stationary structure, a strap (not shown) or the like may be used to secure the camera to the stationary structure, though the strap should have sufficient slack to allow for placement of the main body or bodies between the camera and the stationary structure. In one alternative, a separate strap (not shown) may be used to position the main body onto the stationary structure prior to placement of the camera.

Regardless of the order in which the at least one stackable body and camera are positioned, the method may include the additional step of positioning a second stackable body 110 adjacent to the first stackable body, wherein the first stackable body includes at least one tab 41 on at least one of the right and left surfaces 14, 15 and the second stackable body 110 includes at least one slot 140 on at least one of the right and left surfaces 114, 115. Further, the first and second stackable bodies are positioned relative to one another such that the at least one tab 41 of the first stackable body engages the at least one slot 140 of the second stackable body. In this arrangement, the top and bottom surfaces 112, 113 of the second stackable body include concave back edges 122, 123, such that the concave back edges of the second stackable body engage the stationary structure having a substantially convex surface, and the front surface 11 of the first stackable body engages the camera. Any or all of the top, bottom, left and right surfaces may also include a plurality of teeth 30 which, upon positioning the main body adjacent the stationary structure, may engage the stationary structure to securely engage the main body with the stationary structure. The plurality of teeth may merely engage the surface of the stationary structure or, if the stationary structure has a softer surface (e.g., the bark of a tree), at least one of the plurality of teeth may engage the stationary structure by cutting into the stationary structure such that at least one of the teeth may puncture the surface of the stationary structure. Such engagement may result in greater stability and utility of the main body. Finally, the step of adjusting this arrangement further includes adjusting the stacked first and second bodies and the camera to stabilize the camera against the stationary structure. For ease of use, the stackable bodies may first be connected prior to placement between the camera and stationary structure.

In another embodiment, the present invention includes a kit including a plurality of stackable bodies 10. The stackable bodies may have a wedge shape, as discussed above, and the kit may include stackable bodies each having the same angle of inclination or, alternatively, may have varying angles of inclination. For example, each of the plurality of stackable bodies may have the same general angle of inclination, such as 2.5 degrees, 5 degrees, 10 degrees, 25 degrees, or the like. Alternatively, for example, at least one stackable body may have an angle of inclination of about 2.5 degrees, while at least one other stackable body may have an angle of about 5 degrees, while at least another may have an angle of about 10 degrees, and the like. Any such combinations are envisioned such that multiple angles of inclination can be achieved by a user implementing a single stackable body or combining at least two of the stackable bodies of the kit.

The kit may also optionally include a camera 60, specifically a trail camera 60, though the camera may be sold separately and subsequently combined with the plurality of stackable bodies by the user.

In yet another embodiment, the main body 10, or main bodies 10, 110, may be an integral structure with the camera 60, specifically a trail camera 60. For example, the main body 10 may be monolithic with the trail camera, and may further have an adjustable angle of inclination such that, during use, a user can position the camera against the stationary structure and adjust the angle of the monolithic main body 10 portion to achieve the desired positioning of the camera. Alternatively, the main body or bodies may be separate structures from the camera itself (as illustrated), though at least one of the main bodies may include an attachment structure, on the front surface 11, for example, to fixedly secure the main body to the camera. For example, a clip, adhesive, tab and slot (where one of the tab or slot is positioned on the camera), or other locking feature may be adapted to secure the main body 10, 110 to the camera 60.

While the above embodiments have been illustrated for use with a camera, and specifically a trail camera, capable of taking photographs and/or videos, devices other than cameras may also be used with the wedge-shaped main body of the present invention, including but not limited to sensors, gps devices, other hunting, tracking and outdoors devices, and the like.

Moreover, while the above discussion has focused on the use of the main body 10 with a trail camera specifically for use in hunting, it is envisioned that the wedge-shaped main body 10 may also be used in other situations other than hunting, and may further be used with cameras and like equipment in activities other than hunting where a particular angle of inclination of the lens of the camera relative to a stationary structure would be beneficial.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for stabilizing a camera, the apparatus comprising:
   a first main body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the camera, and at least one of the edges of the top, bottom, left and right surfaces including a plurality of teeth along at least a portion of a length of the at least one edge.

2. The apparatus of claim 1, further comprising a second main body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the camera, and at least one of the edges of the top, bottom, left and right surfaces including a plurality of teeth along at least a portion of a length of the at least one edge, wherein the first body includes at least one tab on at least one of the right and left surfaces and the second body includes at least one slot on at least one of the right and left surfaces wherein the at least one tab is shaped to engage the at least one slot.

3. The apparatus of claim 2, wherein the first main body stacks on top of the second main body.

4. The apparatus of claim 3, wherein the stacked first and second main bodies form a wedge shape.

5. The apparatus of claim 4, wherein the top, left and right surfaces of each of the first and second main bodies include a stepped surface.

6. The apparatus of claim 5, wherein the stepped surfaces of the first and second main bodies are coincident with one another.

7. The apparatus of claim 1, wherein the concave back edges of the top and bottom surfaces are adapted to engage a portion of a tree.

8. The apparatus of claim 1, wherein the plurality of teeth are positioned along the top edge.

9. The apparatus of claim 1, wherein the plurality of teeth are positioned along at least a portion of the lengths of each of the top, left and right edges.

10. The apparatus of either of claim 8 or 9, wherein the plurality of teeth are adapted to engage a portion of a tree.

11. An apparatus for stabilizing a trail camera, the apparatus comprising:
a first stackable body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the trail camera, each of the edges of the top, left and right surfaces including a plurality of teeth along at least a portion of respective lengths of the edges.

12. The apparatus of claim 11, further comprising:
a second stackable body having at least front, top, bottom, left and right surfaces forming a wedge shape, the top and bottom surfaces including a concave back edge adapted to engage a stationary structure, the left and right surfaces including edges adapted to engage a stationary structure, the front surface including a surface texture adapted to engage the trail camera, each of the edges of the top, left and right surfaces including a plurality of teeth along at least a portion of respective lengths of the edges, and at least one slot on at least one of the right and left surfaces,
wherein the first stackable body includes at least one tab on at least one of the right and left surfaces; and the at least one tab is shaped to engage the at least one slot.

13. The apparatus of claim 12, wherein the stacked first and second bodies form a wedge shape.

14. The apparatus of claim 13, wherein the top, left and right surfaces of each of the first and second main bodies include a stepped surface, wherein the stepped surfaces of the first and second main bodies are coincident with one another.

15. The apparatus of claim 11, wherein the concave back edges of the top and bottom surfaces are adapted to engage a portion of a tree.

16. The apparatus of claim 11, wherein the plurality of teeth are positioned along the entirety of the top, left and right edges, of either the first stackable body, second stackable body, or both.

17. A method of stabilizing a camera against a stationary structure including the steps of:
positioning the camera adjacent to the stationary structure;
positioning a first stackable body having at least front, top, bottom, left and right surfaces forming a wedge shape, each of said surfaces having an edge, and each of the edges of the top, left and right surfaces including a plurality of teeth along at least a portion of respective lengths of the edges, such that the plurality of teeth engage the stationary structure and the front surface engages the camera; and
adjusting the first stackable body and camera to stabilize the camera against the stationary structure.

18. The method of claim 17, wherein the edges of the top and bottom surfaces both include a concave shape, wherein the concave edges engage the stationary structure having a substantially convex surface.

19. The method of claim 18, wherein the stationary structure is a tree and the camera is a trail camera, wherein the substantially convex surface of the tree is a trunk or a branch of the tree.

20. The method of claim 17, wherein the first stackable body includes at least one tab on at least one of the right and left surfaces.

21. The method of claim 20, wherein the method includes the additional step of positioning a second stackable body adjacent to the first stackable body, the second stackable body having at least front, top, bottom, left and right surfaces forming a wedge shape, wherein the second stackable body includes at least one slot on at least one of the right and left surfaces.

22. The method of claim 21, wherein the first and second stackable bodies are positioned relative to one another such that the at least one tab of the first stackable body engages the at least one slot of the second stackable body.

23. The method of claim 22, wherein the top and bottom surfaces of the second stackable body include a concave back edge, wherein the concave back edges engage the stationary structure having a substantially convex surface, and the front surface of the first stackable body engages the camera.

24. The method of claim 23, wherein the step of adjusting further includes adjusting the stacked first and second bodies and the camera to stabilize the camera against the stationary structure.

* * * * *